United States Patent [19]
Sturges

[11] Patent Number: 5,890,554
[45] Date of Patent: Apr. 6, 1999

[54] MINIATURE VEHICLE

[75] Inventor: Daniel D. Sturges, Ann Arbor, Mich.

[73] Assignee: trans2 Corporation, Livonia, Mich.

[21] Appl. No.: 946,618

[22] Filed: Oct. 7, 1997

Related U.S. Application Data

[63] Continuation of Ser. No. 674,080, Jul. 1, 1996, abandoned, which is a continuation of Ser. No. 341,476, Nov. 17, 1994, abandoned.

[51] Int. Cl.$^6$ .................................................. B62D 61/00
[52] U.S. Cl. ........................... 180/21; 180/291; 296/209
[58] Field of Search ...................... 280/62, 638, DIG. 5; 180/20, 21, 22, 209, 210, 291, 900, 906; 296/209

[56] References Cited

U.S. PATENT DOCUMENTS

| D. 187,858 | 5/1960 | Pollock . | |
|---|---|---|---|
| 2,232,275 | 2/1941 | Ronning | 180/21 |
| 2,844,209 | 7/1958 | Brunderman . | |
| 3,416,625 | 12/1968 | Narutani | 180/21 |
| 4,368,795 | 1/1983 | Tidwell . | |
| 4,377,215 | 3/1983 | Hare | 180/21 |
| 5,095,430 | 3/1992 | Bonito et al. . | |

FOREIGN PATENT DOCUMENTS

| 421799 | 9/1932 | United Kingdom | 180/21 |
|---|---|---|---|

*Primary Examiner*—Brian L. Johnson
*Assistant Examiner*—Avraham H. Lerner
*Attorney, Agent, or Firm*—Kohn & Associates

[57] ABSTRACT

A motor vehicle is provided having an elongated body with a front and rear end aligned along a longitudinal axis, a right and left seat area, and a right and left entry opening defined in part by a right and left sill member. A pair of front wheels and a pair of rear wheels are pivotally attached to the body generally adjacent the front and rear ends thereof. The front and rear wheels have a tire contact width of $TW_F$ and $TW_R$. The front tires having a front wheel track $WT_F$ and the rear tires having a rear wheel track $WT_R$ measured from center of tire contact to center of tire contact of the tires making up a pair. The front wheel track being greater than the rear wheel track so that $WT_R + TW_R$ is less than $WT_F$. This dimensional relationship enables the sill members to be generally rearwardly inclined relative to the body longitudinal axis to facilitate easy vehicle entry by an occupant.

13 Claims, 2 Drawing Sheets

1

MINIATURE VEHICLE

This is a continuation of application Ser. No. 08/674,080 filed on Jul. 1, 1996 now abandoned which is a continuation of Ser. No. 08/341,476 filed on Nov. 17, 1994 and now abandoned.

TECHNICAL FIELD

The present invention relates to small automotive vehicles having a front wheel track which is significantly greater than a rear wheel track, more particularly to low speed vehicles intended to run on both hard roads and grass surfaces.

BACKGROUND ART

Miniature automotive type vehicles are commonly utilized at golf courses for transporting golfers around the course. These vehicles are frequently referred to motorized golf carts, typically powered by an electric motor and a battery pack, or alteratively by a small internal combustion engine. Motorized golf carts are frequently used in non-golf applications, such as for indoor transportation in large industrial plants or in vacation or retirement communities.

While the majority of automotive vehicles including golf carts or the like have a front and rear wheel track which are substantially identical, there are vehicles illustrated in the prior art which have front and rear tracks which are significantly different (U.S. Pat. DES. 187,858, Pollock; U.S. Pat. No. 2,844,209 to Brunderman and U.S. Pat. No. 4,368,795, Tidwell). In such instances, typically, the pair of wheels having the narrow track is intended to eliminate the need for a differential or to provide golf club storage space.

SUMMARY OF THE INVENTION

An object of the present invention is to provide a miniature vehicle which is very easy for the passenger to enter and exit.

Another object of the present invention is to provide a miniature vehicle suitable for use on hard surface roads as well as on grass surfaces such as golf courses or the like.

Another object of the present invention is to provide a miniature vehicle suitable for low speed commuter use on public streets. Accordingly, a miniature vehicle of the present invention is provided having a body with a central longitudinal axis and a front and rear end. The body has at least two laterally aligned seats on opposite sides of the longitudinal axis and a right and left entry opening outboard of the seats and defined in part by a right and left sill member. The vehicle has a pair of front tires and a pair of rear tires which have a front and rear wheel track $WT_F$ and $WT_R$. The front and rear tires have a tire contact with $TW_F$ and $TW_R$, respectively. The front tire track is greater than the rear tire track wherein $(WT_R+TW_R)$ is less than $WT_F$. The right and left sill members are each generally rearwardly inclined relative to the vehicle's body longitudinal axis facilitating easy entry and exit by the vehicle occupant. Preferably, the right and left door sills are inclined relative to the longitudinal axis by an angle $\alpha$ which is greater than 5°.

BEST MODE FOR CARRYING OUT THE INVENTION

Figure 4:
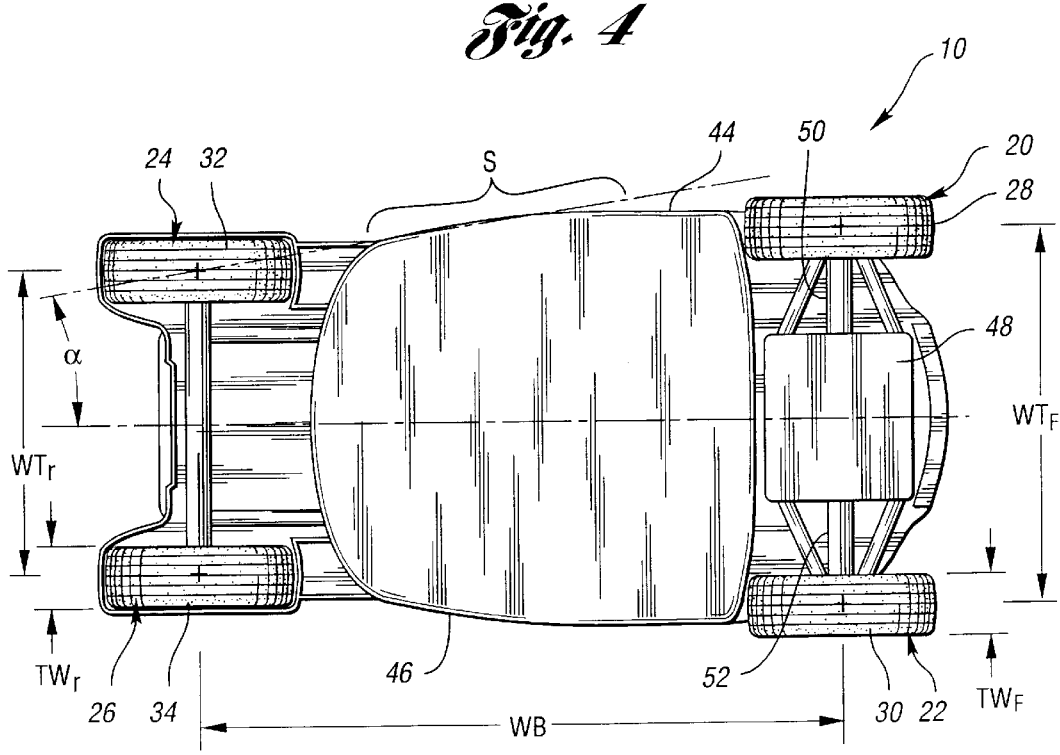
FIG. 4 is a bottom plan view of the vehicle of FIG. 1.

Referring to FIGS. 1–4, a miniature automotive vehicle 10 made in accordance with the present invention is illustrated. Vehicle 10 has a body 12 aligned along longitudinal axis 14 defining a body front end 16 and rear end 18. Laterally aligned on opposite sides of the body are a pair of front wheels 20 and 22 adjacent in front of the end 16 of the body and a pair of rear wheels 24 and 26 adjacent the body rear end 18. Each of the wheels 20, 22, 24 and 26 are each provided with a rubber tire 28, 30, 32 and 34, respectively, for cooperation with a road surface. Each of the tires has a center of tire contact designated by a "+" as shown. In FIG. 4, the center of tire contact is the intersection of the wheel plane and the vertical projection of the wheel spin axis onto the road plane. The distance between the center of tire contacts of the two front tires defines the front wheel track $WT_F$ illustrated in FIG. 4. The distance between the center of tire contacts of the two rear tires, 32 and 34, define the rear wheel track $WT_R$. As shown in FIG. 4, the rear wheel track is significantly less than the front wheel track as will be further defined.

Front tires 28 and 30 have a tire contact width, i.e. the distance between the extreme edges of the tire road contact at the typical vehicle load and the standard tire pressure. The front tire contact width, as shown in FIG. 4, is designated $TW_F$. The rear tire width illustrated in FIG. 4, is designated $TW_R$. The front and rear tire tracks and the front and rear widths are interrelated. The rear track plus the rear tire width $(WT_R+TW_R)$ is less than the front tire track, $WT_F$. Preferably, the rear wheel track plus the rear tire width $(WT_R+TW_R)$ is greater than the front wheel track minus the front tire width $(WT_F-TW_F)$. This relationship provides for a very stable vehicle while having a rearwardly tapering body to facilitate easy entry and exit into the vehicle by an occupant. Furthermore, when the vehicle is driven on a grass surface the narrower rear track minimizes lawn damage since the rear tires do not precisely track in the path of the front tires in normal straight line operation.

Figure 1:
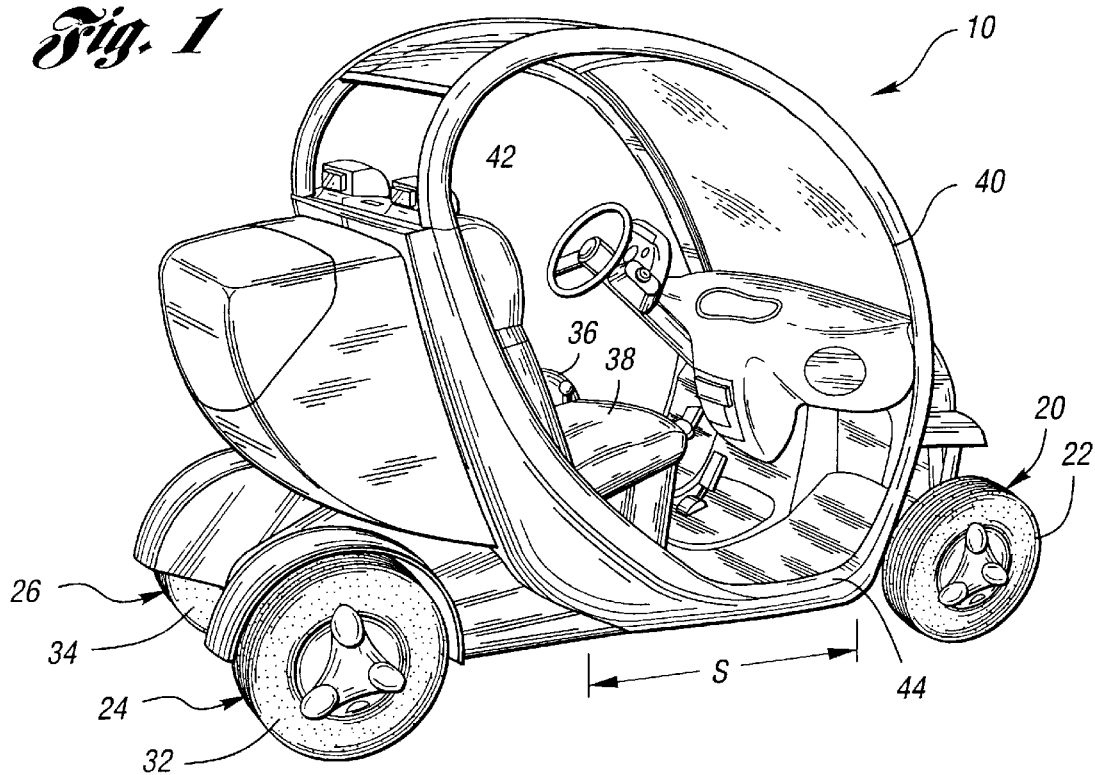
FIG. 1 is a perspective side elevation of the vehicle made in accordance with the present invention.
Figure 2:
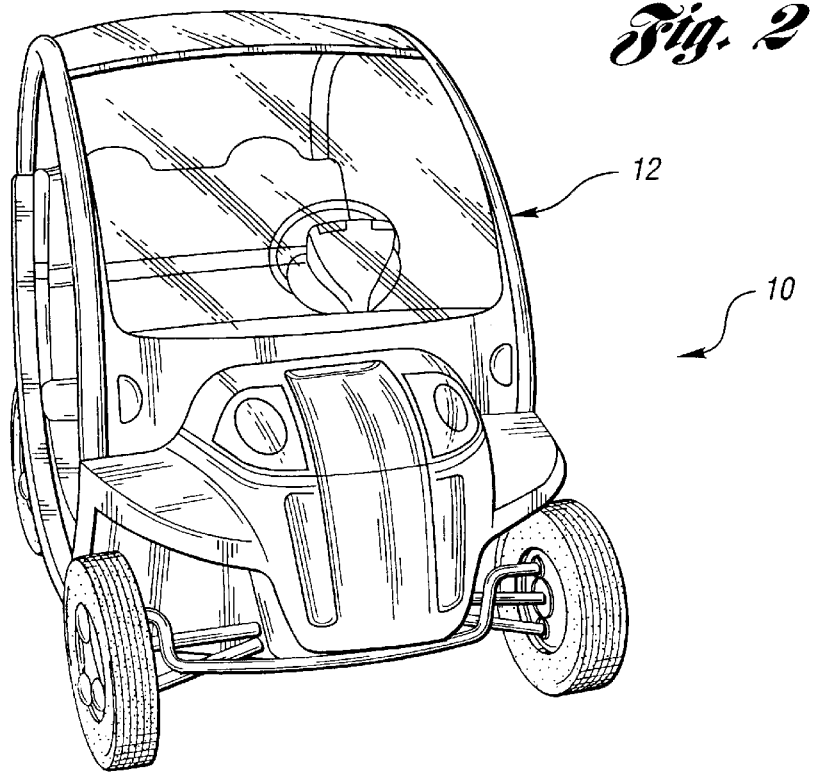
FIG. 2 is a front perspective front view of the vehicle in FIG. 1.
Figure 3:
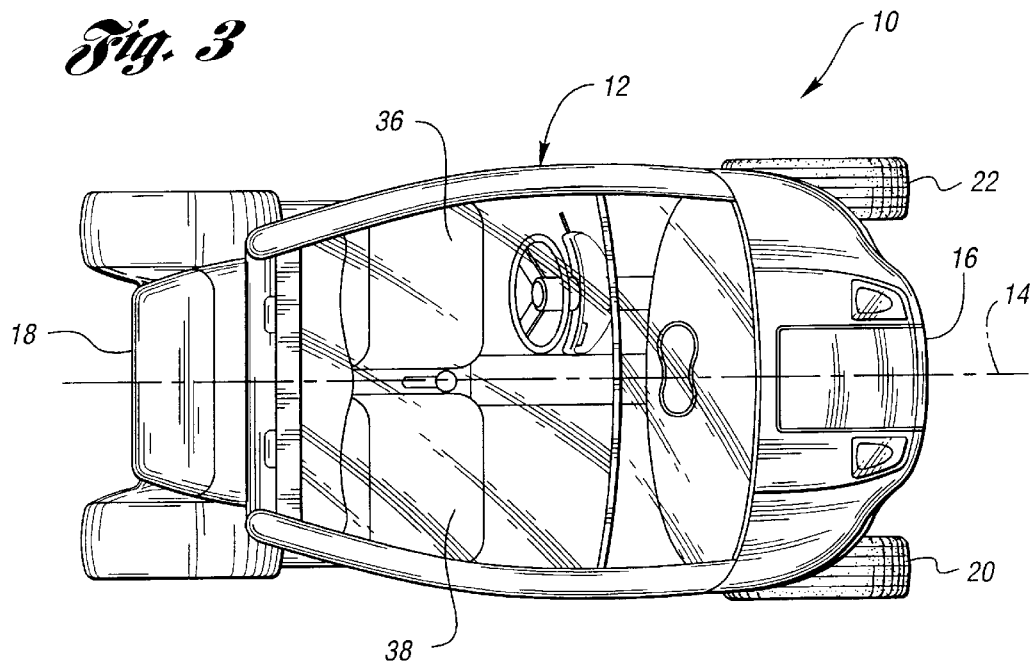
FIG. 3 is a top plan view of the vehicle of FIG. 1.

Vehicle body 10 is provided with at least two seat areas 36 and 38 for the vehicle passenger and the vehicle driver, respectively. Outboard of the seats are right and left entry openings 40 and 42 which are defined in part by right and left sill members 44 and 46. The sill members have a lower most region having a sill length S as shown in FIGS. 1 and 4 in which the vehicle occupant must step across when entering the vehicle. The sill throughout the region S is generally, rearwardly inclined relative to the longitudinal axis 14, by an angle $\alpha$ as illustrated in FIG. 4. Preferably, $\alpha$ is greater than 5°. Preferably $\alpha$ is less than 20° and most preferably, $\alpha$ falls within the 5° to 10° range throughout the range S, the region of the occupant steps across when entering the vehicle.

The tapered body configuration with the rearwardly inclined sills has been found to be particularly advantageous when the vehicle is manufactured without doors. It is more difficult to enter and exit a vehicle when doors are not available to support and stabilize the occupant. When the sills are tapered significantly less than 5°, the advantages of the rearwardly inclined sill are significantly reduced. On the other hand, if the sills are inclined significantly beyond 20°, seat area and rear wheel track are reduced adversely affecting vehicle function.

The front and rear wheel tracks are also related to the wheel base (WB), i.e. the longitudinal distance between the front and rear wheel centers, illustrated in FIG. 4. Preferably, wheel base WB is slightly less than the sum of the front and rear tracks $WT_F+WT_R$. Most preferably, the wheel base is greater than two times the rear wheel track, $WT_R$ and less than two times the front wheel track $WT_F$.

The dimensions of an embodiment of the invention which has been tested and determined to work quite satisfactorily are set forth below:

EXAMPLE NO. 1

$WT_F$=1094 mm
$WT_R$=870 mm
$TW_F$=122 mm
$TW_R$=122 mm
WB=1806 mm
$\alpha=6°$
Tire Size=146×205 mm (5.7"–8" electra series)

In the preferred embodiment of the invention disclosed, the vehicle is provided with a front wheel electric DC drive motor/transmission assembly 48 operatively connected to the front wheels 20 and 22 by right and left axles 50 and 52. The front wheels are suspended relative to the body realizing a conventional independent suspension mechanism. The rear wheels are pivotally attached to a typical automotive type open channel torsion tube mounted on a pair of trailing control arms. The body is suspended relative to the rear wheels using a conventional spring over shock mechanism not shown.

In an electric vehicle embodiment of the invention, batteries will be conveniently located in order to achieve the desired weight distribution, preferably, at least a portion of the batteries utilized in the vehicle will be oriented under the seats 36 and 38. It should be appreciated, of course, that the invention can be utilized in conjunction with a gasoline engine and appropriate transmission, however, an electric vehicle is preferred due to the noise and exhaust emission problems typically associated with internal combustion engines.

While the best mode for carrying out the invention has been described in detail, those familiar with the art to which this invention relates will recognize various alternative designs and embodiments for practicing the invention as defined by the following claims.

What is claimed is:

1. A small low speed automotive vehicle for use on both hard roads and lawn surfaces comprising;
   a body having a longitudinal axis with opposed front and rear ends, at least two seat areas laterally aligned on opposite sides of the longitudinal axis and right and left entry openings laterally aligned outboard of the seat areas and defined in part by right and left sill members adjacent to two of the at least two seat areas;
   a pair of front wheels pivotably mounted in lateral alignment relative to the body on opposite sides of the longitudinal axis generally adjacent the body front end, each of said front wheels having a front tire engaging a ground surface, the front tires having a tire contact width ($TW_F$) and a center of tire contact, the distance between the center of tire contacts of the right and left tires defining therebetween a front wheel track ($WT_F$); and
   a pair of rear wheels pivotably mounted in lateral alignment relative to the body on opposite sides of the longitudinal axis generally adjacent the body rear end, each of said rear wheels having a rear tire engaging a ground surface, the rear tires having a tire contact width ($TW_R$) and a center of tire contact, the distance between the center of tire contacts of the right and left tires defining therebetween a rear wheel track ($WT_R$); and wherein ($WT_R+TW_R$) is less than $WT_F$ and greater than ($WT_F-TW_F$) and said right and left sill members are each generally rearwardly inclined in plan view relative to the body longitudinal axis facilitating easy entry and exit of the vehicle by an occupant and minimizing lawn damage resulting from the front and rear tires tracking in the same path.

2. The vehicle of claim 1 wherein said right and left door sill members are inclined relative to the vehicle longitudinal axis by an angle $\alpha$ which is greater than 5°.

3. The vehicle of claim 2 wherein angle $\alpha$ is less than 20°.

4. The vehicle of claim 1 wherein the vehicle has a wheel base (WB) which is less than ($WT_R+WT_F$).

5. The vehicle of claim 1 further comprising an independent front suspension mechanism steerably mounting the front wheels to the body.

6. The vehicle of claim 1 further comprising a pair of trailing control arms forming a rear suspension mounting the rear tires to the body wherein the rear tires extend rearward of the body rear end measured at the body longitudinal axis.

7. The vehicle of claim 6 further comprising a transversely oriented open channel torsion tube attached to the pair of trailing control arms and pivotally supporting the rear wheels.

8. The vehicle of claim 1 further comprising a front wheel drive electric DC motor/transmission assembly mounted to the body and rotatable driving the front wheels.

9. A small low speed automotive vehicle for use on both hard roads and lawn surfaces comprising;
   a body having a longitudinal axis with opposed front and rear ends, at least two seat areas laterally aligned on opposite sides of the longitudinal axis and right and left entry openings laterally aligned outboard of the seat areas and defined in part by right and left sill members adjacent to two of the at least two seat areas;
   a pair of front wheels pivotably mounted in lateral alignment relative to the body on opposite sides of the longitudinal axis generally adjacent the body front end, each of said front wheels having a front tire engaging a around surface, the front tires having a tire contact width ($TW_F$) and a center of tire contact, the distance between the center of tire contacts of the right and left tires defining therebetween a front wheel track ($WT_F$);
   a front wheel drive electric DC motor/transmission assembly mounted to the body and rotatably driving the pair of front wheels;
   a pair of rear wheels pivotably mounted in lateral alignment relative to the body on opposite sides of the longitudinal axis generally adjacent the body rear end, each of said rear wheels having a rear tire engaging a ground surface, the rear tires having a tire contact width ($TW_R$) and a center of tire contact, the distance between the center of tire contacts of the right and left tires defining therebetween a rear wheel track ($WT_R$); and wherein ($WT_R+TW_R$) is less than $WT_F$ and greater than ($WT_F-TW_F$) thereby maintaining sufficient rear wheel track to achieve stability while minimizing lawn damage resulting from the front and rear tires tracking in the same path.

10. The vehicle of claim 9 further comprising a pair of trailing control arms forming a rear suspension mounting the rear tires to the body wherein the rear tires extend rearward of the body rear end measured at the body longitudinal axis.

11. The vehicle of claim 9 further comprising a transversely oriented open channel torsion tube attached to the pair of trailing control arm and pivotally supporting the rear wheels.

12. The vehicle of claim 9 wherein said right and left door sill members are inwardly rearwardly inclined relative to the vehicle longitudinal axis by an angle $\alpha$ which is greater than 5°.

13. The vehicle of claim 9 wherein the vehicle has a wheel base (WB) which is less than ($WT_R + WT_F$).

* * * * *